(No Model.)

H. M. LOOMIS.
WHEELBARROW.

No. 264,720. Patented Sept. 19, 1882.

Witnesses

Inventor:
H. M. Loomis
By

UNITED STATES PATENT OFFICE.

HENRY M. LOOMIS, OF HARTLAND CENTRE, CONNECTICUT.

WHEELBARROW.

SPECIFICATION forming part of Letters Patent No. 264,720, dated September 19, 1882.

Application filed March 7, 1882. (No model.)

*To all whom it may concern:*

Be it known that I, HENRY M. LOOMIS, a citizen of the United States of America, residing at Hartland Centre, in the county of Hartford and State of Connecticut, have invented certain new and useful Improvements in Wheelbarrows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
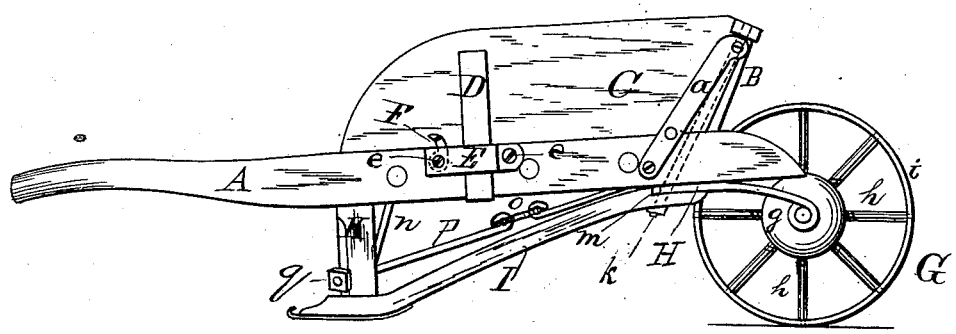
Figure 2:
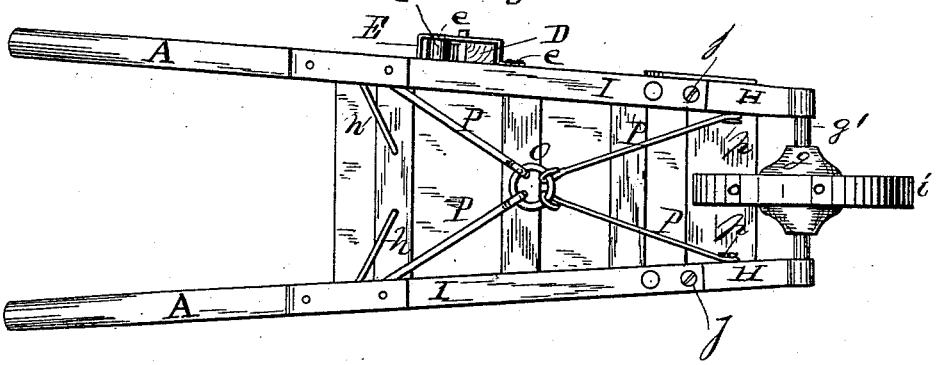

Figure 1 is a side elevation of a wheelbarrow embodying my invention, and Fig. 2 is a plan or bottom view of the same.

Like letters refer to like parts in both figures.

A represents the usual side rail, and B the end-board post, to each of which is suitably secured a strap of iron, $a$, which, in connection with the end edge of the end-board, forms a pocket or mortise for the reception of the end of the side-board C, which is provided with a post, D, projecting below and at a right angle to the lower edge of the side-board and through a staple, E, secured to the side rail. Said staple E is of greater length than the width of the post D, the excess in length providing space therein for a pivoted catch or locking-lever, F, the function of which is to secure the post from longitudinal movement in the staple, whereby the side-board is securely held in place. If desired, a depression or notch may be made in the rear edge of the post D, so that when dropped the latch will lie therein; but the simple wedging action of the latch against the post retains it in position. The staple E is secured by two screws, $e\ e$, one of which also serves as the pivot of the catch F.

G represents the wheel, which consists of the hub $g$, preferably of cast-iron, and having a separate or, if desired, integral axle, $g'$, and provided at its periphery with screw-threaded holes for the reception of the screw-threaded spokes $h$, the outer ends of which are shouldered to pass through holes in the tire $i$ and bear against the inner surface of the wrought or cast metal tire $i$. By this construction each spoke is adapted to be shortened or lengthened in the distance it projects from the hub, whereby the tire may be firmly connected to the hub.

From each end of the axle extend curved springs H, perforated at $j$ for the passage therethrough of a bolt, $k$, which serves to secure the spring H, brace I, and side rail, A, firmly together, the said brace being properly mortised for the reception of the spring at $m$, and suitably connected to the legs K, as shown, which construction braces the legs longitudinally, while the metal braces $n$ strengthen them laterally.

To a centrally-located ring, O, are suitably united four diagonal brace-rods, P, two of which are suitably secured to the legs K and the remaining two (one each) to the inner surfaces of the front ends of the side rails at $p$. Preferably the brace-rods which are attached to the legs are passed therethrough diagonally and screw-threaded, whereby the entire set of rods may be tightened by means of the nuts $q\ q$, one only of which is shown, and the side and cross rails of the barrow are firmly bound together.

If desired, the bolt $k$ may serve to bind together the top rail of the end board, the end-board posts, the brace, the side rail, and the spring by simply increasing its length, as shown in dotted lines.

Having described my invention, what I claim as new, and desire to secure by Letters Patent, is—

1. The combination of the side rail, A, staple E, and screws $e\ e$, and catch F, one of the said screws serving as the pivot of the catch, substantially as shown and described.

2. The combination of the ring O and brace-rods P with the side rails, A, and legs K, substantially as shown and described.

In testimony whereof I affix my signature in presence of two witnesses.

HENRY M. LOOMIS.

Witnesses:
F. L. BISHOP,
FREDERICK RIPLEY.